United States Patent
Jones

[19]

[11] Patent Number: 5,889,254
[45] Date of Patent: Mar. 30, 1999

[54] METHOD AND APPARATUS FOR ND: YAG HARDSURFACING

[75] Inventor: Marshall Gordon Jones, Scotia, N.Y.

[73] Assignee: General Electric Company, Schenectady, N.Y.

[21] Appl. No.: 899,696

[22] Filed: Jul. 25, 1997

Related U.S. Application Data

[63] Continuation of Ser. No. 561,998, Nov. 22, 1995, abandoned.

[51] Int. Cl.$^6$ .................................................. B23K 26/08
[52] U.S. Cl. ............................... 219/121.63; 219/121.64; 219/121.66; 427/597; 148/512
[58] Field of Search ............................ 219/76.1, 121.63, 219/121.64, 121.65, 121.66, 121.84, 121.85; 29/889.71; 427/554, 555, 556, 596, 597; 148/512, 525

[56] References Cited

U.S. PATENT DOCUMENTS

| | | | |
|---|---|---|---|
| 3,837,761 | 9/1974 | Brown | 416/191 |
| 3,952,180 | 4/1976 | Gnanamuthu | 219/121.65 |
| 4,157,923 | 6/1979 | Yen et al. | 148/525 |
| 4,323,756 | 4/1982 | Brown et al. | 219/121.66 |
| 5,366,345 | 11/1994 | Gerdes et al. | 427/554 |
| 5,372,861 | 12/1994 | Kerrand et al. | 427/596 |
| 5,430,270 | 7/1995 | Findlan et al. | 219/121.63 |
| 5,449,536 | 9/1995 | Funkhouser et al. | 427/597 |

OTHER PUBLICATIONS

*Superalloys II,* xiii–xx; 3–4; 495–516; 579–580; 587–589; 601–603; (Chester T. Sims et al. eds., 1987).

Irisawa et al., "Surface Improvement for Inside Surface of Small Diameter Pipes by Laser Cladding Technique", Ishikawajima–Harima Heavy Industries Co., Ltd., Aug. 1991, pp. 1036–1044.

*Primary Examiner*—Gregory L. Mills
*Attorney, Agent, or Firm*—Tyler Maddry; Noreen C. Johnson

[57] ABSTRACT

A method and apparatus are provided for hardsurface cladding a workpiece such as a tip shroud notch face of a turbine bucket configured for contact engagement with an adjacent tip shroud notch face. A continuous wave laser beam is generated in a Nd:YAG laser and directed on the notch face at a spot to provide heat thereat. A hardsurface cladding wire is dispensed at the spot under a shielding gas for being melted by the laser beam to form a molten cladding layer on the notch face. The laser beam and wire are traversed over the notch face to form a cladding layer over the entire notch face, which is cooled and solidified in a hardsurface cladding layer integrally bonded to the notch face.

12 Claims, 3 Drawing Sheets

METHOD AND APPARATUS FOR ND: YAG HARDSURFACING

This application is a continuation of application Ser. No. 08/561,998 filed Nov. 22, 1995, now abandoned.

BACKGROUND OF THE INVENTION

The present invention relates generally to hardsurfacing a workpiece for effecting wear resistance, and, more specifically, to hardsurfacing superalloys subject to heat induced cracking.

Large industrial gas turbine engines may be used for powering an electrical generator for producing electrical power. The engine conventionally includes a compressor for compressing air which is mixed with fuel and ignited in a combustor for generating combustion gases which are channeled through one or more turbine stages which extract energy therefrom. Each turbine stage includes a plurality of circumferentially adjoining turbine rotor blades or buckets extending radially outwardly from a rotor disk to which they are conventionally mounted. In some designs, undesirable bucket vibrations may be eliminated by providing frictional damping using interconnecting tip shrouds integrally joined to the radially outer ends of the buckets. An exemplary tip shroud is generally rectangular in plan view and forms with adjoining tip shrouds a circumferentially continuous outer shroud ring around the buckets. Adjacent tip shrouds are complementary with each other and have a generally Z-notch therein, with the middle of each notch having a face which abuts an adjacent notch face during rotary operation of the buckets. The notch faces therefore define contact surfaces which provide frictional damping to reduce or eliminate undesirable bucket vibration during operation.

Since the notch faces are contact surfaces they typically require suitable hardsurfacing treatment to effect a suitably high wear resistance layer or cladding thereon for obtaining a suitable useful life of the buckets during operation.

Modern turbine buckets are typically formed of conventionally known superalloys for maximizing strength and useful life, and are therefore expensive to manufacture. Each bucket must be suitably manufactured and pre-machined prior to hardsurface treatment, and therefore care must be taken in the hardsurface treatment in order to avoid damaging the bucket and rendering it unacceptable for turbine use. Conventional hardsurface treatments necessarily impart heat into the bucket tip shrouds which must be carefully controlled to avoid or minimize heat induced cracking or damage in the superalloy parent material.

One conventional manner of turbine tip shroud hardsurfacing uses a conventional thermal spray process in which the portions of the tip shroud not requiring hardsurfacing are covered with a protective tape, with the notch face then being coated with a suitable hardsurface material such as chromium-carbide (CrC) which is sprayed thereon using a high temperature thermal spray process. This process is labor intensive and expensive.

Another conventional process utilizes a carbon dioxide ($CO_2$) laser which melts a suitable high wear resistance material in powder form such as conventionally known Stellite (28Cr-19.5W-5Ni). Since the superalloy parent tip shroud material and the wear resistance coatings are different materials, the various hard surface processes must be carefully qualified to ensure the formation of a suitable wear resistance coating without unacceptably damaging the parent material by introducing heat effected microcracks for example.

Since the wear resistance material is in a powder form, some of the powder is dissipated during the process and does not deposit in the region of the notch face. The lost powder is therefore wasted. And, using a powder in the $CO_2$ laser process typically results in the deposition of the wear resistance cladding which is non-uniform in thickness and typically has a valley in the middle portion thereof which must be suitably filled during the process.

Since the final notch face must be formed within suitable relatively small tolerances on the order of mils, the hardsurfacing treatment usually provides excess cladding so that it may be machined in a post operation to the required dimensions of the Z-notch. If insufficient hard surface cladding is initially formed in the different treatments, yet another process such as conventional tungsten inert gas (TIG) welding is then used to add additional hardsurface material to the notch face to suitably increase its size for machining to the required final dimensions. If heat induced cracks or other defects are detected in the hardsurfacing cladding or in the heat affected zone of the parent tip shroud material, a manual, hand TIG repair process is typically used. Accordingly, it is desirable to provide an improved hardsurfacing process for applying high wear resistance coatings to a superalloy turbine bucket tip shroud.

SUMMARY OF THE INVENTION

A method and apparatus are provided for hardsurface cladding a workpiece such as a tip shroud notch face of a turbine bucket configured for contact engagement with an adjacent tip shroud notch face. A laser beam is generated in a Nd:YAG laser and directed on the notch face at a spot to provide heat thereat. A hardsurface cladding wire is dispensed at the spot under a shielding gas for being melted by the laser beam to form a molten cladding layer on the notch face. The laser beam and wire are traversed over the notch face to continue the cladding layer over the entire notch face, which is cooled and solidified in a hardsurface cladding layer integrally bonded to the notch face.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
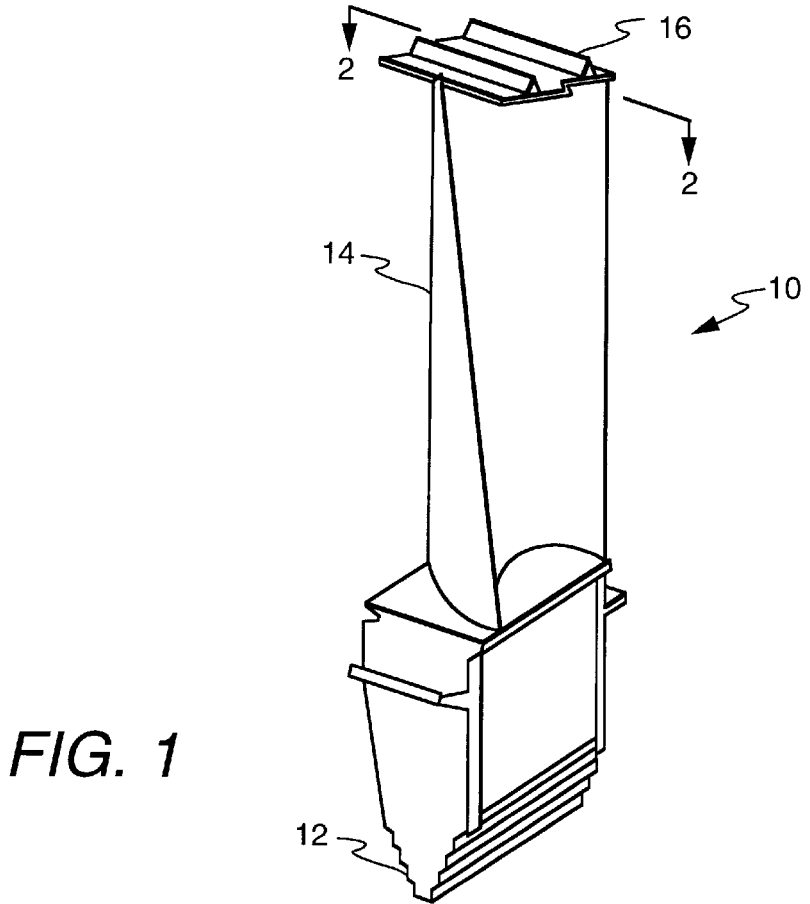
FIG. 1 is an isometric view of an exemplary workpiece in the form of a gas turbine engine turbine rotor blade or bucket having a tip shroud including a Z-notch contact face requiring hardsurfacing treatment.

Illustrated in FIG. 1 is an exemplary industrial gas turbine engine rotor blade or bucket 10 which is one of several circumferentially adjoining buckets which extend radially outwardly from a conventional rotor disk (not shown). Each bucket 10 includes a conventional bucket mounting dovetail or tang 12 which radially retains the bucket 10 in the rotor disk in a conventional manner. The bucket 10 is an integral one-piece component which further includes a conventional airfoil 14 which extends upwardly from the tang 12 and over which hot combustion gases flow during operation, with the airfoil 14 extracting energy therefrom for rotating the rotor disk to provide useful work. Integrally disposed at the radially outer end of the airfoil 14 is a tip shroud 16 which may take any suitable configuration as desired.

Figure 2:
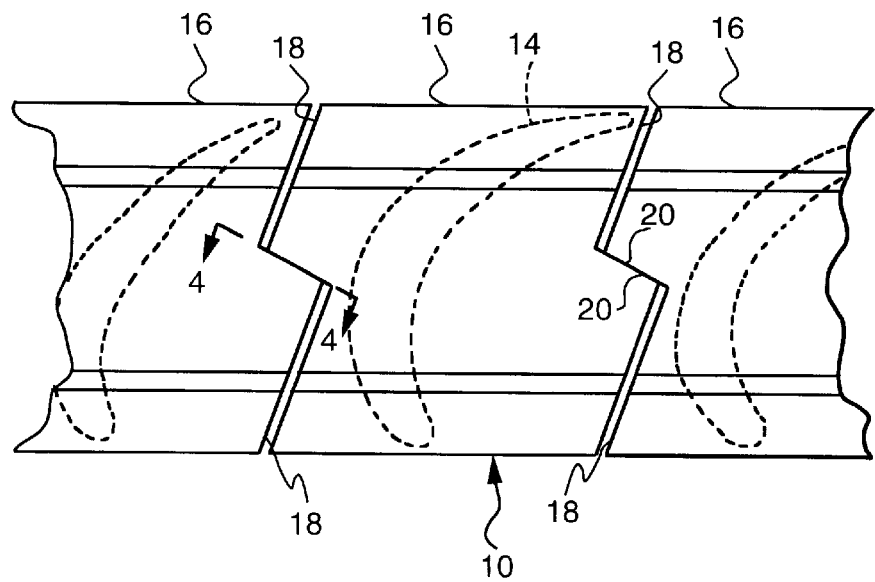
FIG. 2 is a top view of adjacent ones of bucket tip shrouds showing abutting notch faces which require hardsurface cladding, and taken generally along line 2—2 of FIG. 1.

Adjacent tip shrouds 16 are illustrated in more particularity in FIG. 2 in an assembly with their corresponding buckets 10 on the rotor disk, which during rotary operation effects centrifugal loading through the tip shrouds 16 for locking together the tip shrouds for effecting frictional damping and thereby reducing or eliminating undesirable bucket vibration in a conventionally known manner. In the exemplary embodiment of the tip shroud 16 illustrated in FIGS. 1 and 2, each shroud is generally rectangular in configuration and has two parallel axially spaced apart sides, and two interconnected circumferentially spaced apart sides which abut adjacent tip shrouds 16. The circumferential sides are in the exemplary form of Z-notches 18. For purposes of the present invention the Z-notches 18 may take any conventional configuration and are typically provided in mirror image on both sides of the tip shrouds and therefore a single reference designation 18 is used. Each Z-notch 18 includes a suitably configured notch surface or face 20 typically disposed at the axial middle of the tip shroud which forms the abutting contact surface with an adjacent notch face 20 of an adjacent tip shroud 16 during operation. The remainder of the Z-notches 18 are typically provided with a suitable clearance between adjacent tip shrouds 16 all in a conventionally known manner.

Figure 3:
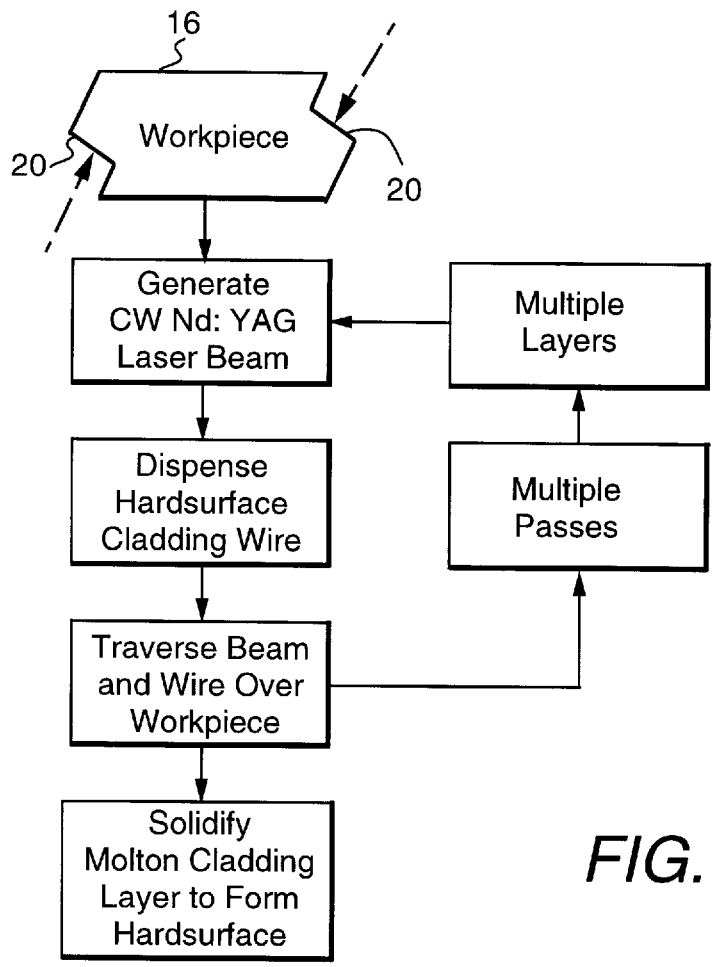
FIG. 3 is an exemplary flowchart representation of a method for hardsurface treating of the notch face using a Nd:YAG laser and hardsurface cladding wire.

For purposes of the present invention, the notch faces 20 define workpieces upon which a suitable wear resistance cladding is deposited in accordance with the present invention in an improved method. The hardsurfacing method of the present invention is illustrated in an exemplary flowchart form in FIG. 3 for depositing the wear resistance cladding on the respective notch faces 20.

Figure 4:
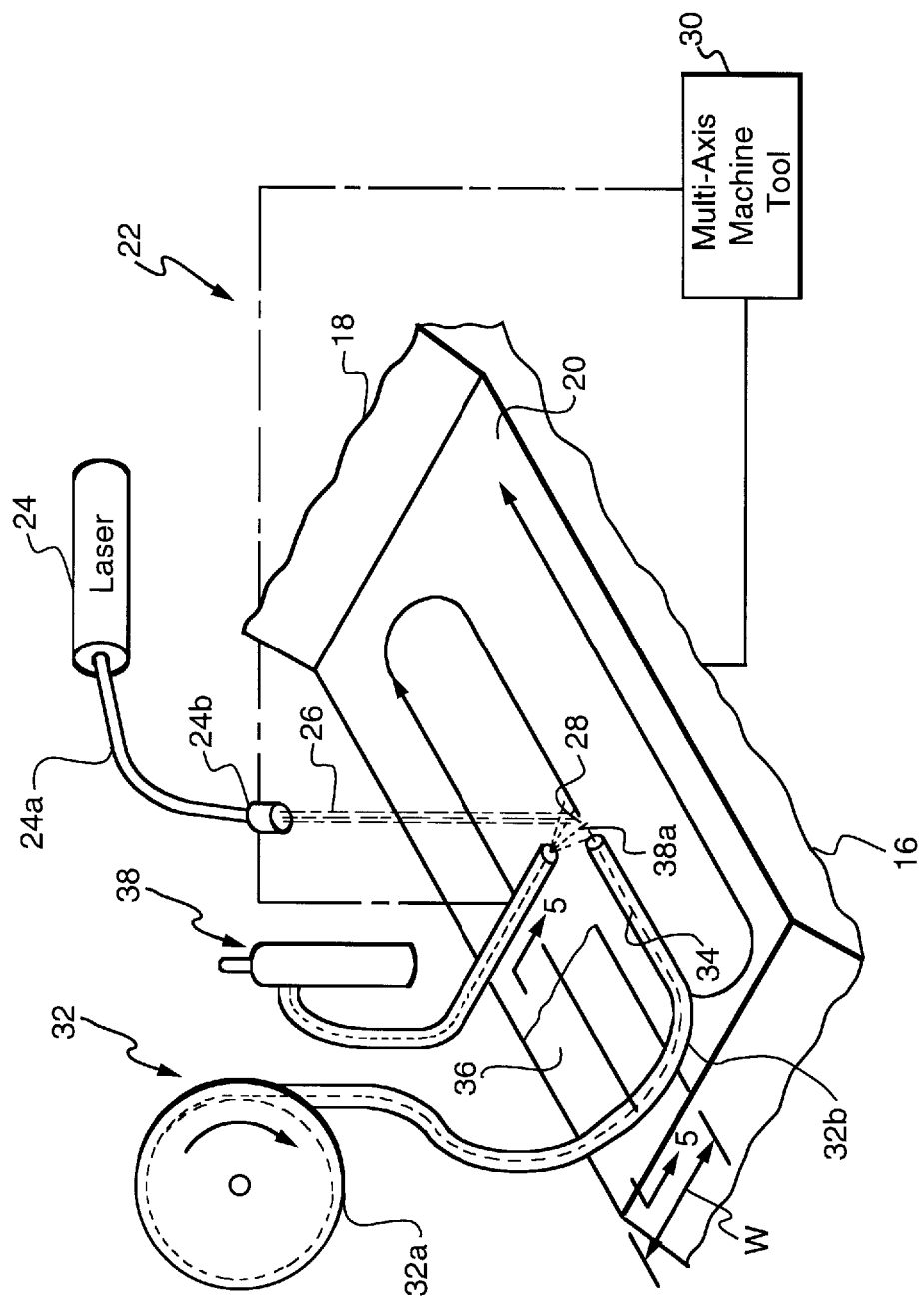
FIG. 4 is a schematic representation of an apparatus for carrying out the hardsurfacing method illustrated in FIG. 3, with the notch face being taken generally along line 4—4 of FIG. 2.

An exemplary hardsurfacing apparatus 22 is illustrated schematically in FIG. 4 for depositing the wear resistance cladding on the individual notch faces 20. In accordance with an exemplary embodiment of the present invention, a neodymium (Nd):yttrium-aluminum-garnet (YAG) laser 24 is preferably operable in a continuous wave (CW) mode for generating a continuous wave laser beam 26 at a spot 28 on the notch face 20 to provide suitable heat input thereat. A suitable CW Nd:YAG laser 24 effective for producing power up to about 3 Kw in the vicinity of the spot 28 is commercially available from the Hobart Company of Livermore, Calif., in model number 3000 HLP, for example. Although the CW Nd:YAG laser 24 is preferred for maximizing speed of the hardsurfacing process, a suitable pulse Nd:YAG laser could also be used, for example Model 704 of the Lumonics Corp., of Michigan, at slower process rates. The laser 24 includes a conventional fiber optic 24a for channeling the laser beam therethrough which is discharged from a conventional output coupler 24b for preferentially directing the laser beam 26 where desired.

A conventional multi-axis machine tool 30, such as a 3-axis tool, is provided for suitably mounting the bucket 10, and corresponding tip shroud 16, relative to the laser 24. The laser 24 is effective for generating the laser beam 26 in a continuous wave mode, and the laser beam 26 is then directed or aimed on the notch face 20 at the spot 28 to provide heat input thereat.

Means 32 are provided for dispensing a suitable hardsurfacing cladding wire 34 at the spot 28 for being melted by the laser beam 26 to form a corresponding molten cladding layer on the notch face 20. The dispensing means 32 may take any suitable conventional form including a suitably powered reel 32a upon which the wire 34 is stored, and from which it is dispensed through a suitable guide 32b having a tip from which the wire 34 is dispensed in the vicinity of the spot 28, and in the direction parallel to the beam travel and cladding direction, for being melted by the laser beam 26.

Conventional means 38 are also provided to discharge a suitable inert cover or shielding gas 38a, such as Argon, over the molten cladding layer being deposited. The shielding means 38 may include a storage tank, and supply conduit suitably positioned with the moving spot 28.

The method further includes traversing the laser beam 26 and the wire 34 in a suitable pattern over the notch face 20 to form the cladding layer completely over the entire notch face 20. Either the notch face 20 itself may be moved relative to the wire 34, laser beam 26, and cover gas 38a which may remain stationary, or, alternatively, the wire 34, laser beam 26, and cover gas 38a may be traversed relative to the stationary notch face 20. The machine tool 30 is illustrated schematically in solid line for suitably traversing the notch face 20 relative to the stationary laser beam 26 and wire 34; and in phantom line for traversing the wire 34 and laser beam 26 relative to the stationary notch face 20. In either arrangement, the laser beam 26 and wire 34 may be traversed over the notch face 20 so that the spot 28 follows a predetermined pattern for depositing a molten strip of the cladding wire 34 over the face 20 to cover the entire surface as desired. As the wire 34 is melted and deposited along the notch face 20, the laser beam 26 is traversed and fresh wire 34 is provided in a continuous moving process. As the laser beam 26 moves away from the previously deposited wire 34, the molten cladding layer deposited is allowed to cool, by room air for example, to solidify in a hardsurface cladding layer 36 as illustrated schematically in FIG. 5.

Figure 5:
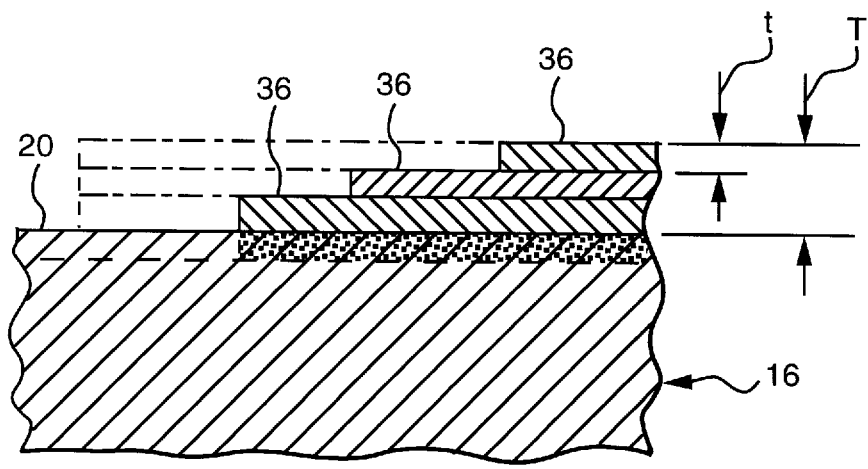
FIG. 5 is an elevational sectional view of a portion of the notch face illustrated in FIG. 4 taken along line 5—5 and illustrating multiple layer buildup of hardsurface cladding.

As shown in FIG. 4, an exemplary traversing pattern includes a parallel zigzag arrangement so that the laser beam 26 and wire 34 are traversed over the entire notch face 20 which adjoining passes to form a substantially flat and uniform hardsurface cladding layer 36 over the entire notch face 20. In a preferred embodiment, the laser beam 26 and wire 34 are traversed over the notch face 20 to form a plurality of overlaying cladding layers 36 as illustrated in FIG. 5 each having a nominal individual thickness t which collectively build a collective thickness T above the notch face 20. In an exemplary embodiment, each pass can deposit a cladding layer 36 having a thickness t in the range of about 10–20 mils, with a width W as illustrated in FIG. 4 in the range of about 30–50 mils, and at a traversing speed of about 10–40 inches per minute (IPM). Since the typical hardsurface cladding required for the Z-notch face 20 is on the order of about 40 mils, several passes and layers are required to build a suitable thickness.

The YAG laser 24 has a shorter wavelength of about 1.06 microns relative to the longer wavelength of about 10.6 microns of a typical $CO_2$ laser typically used for hardsurfacing treatment with a powder cladding material. The shorter wavelength of the YAG laser more effectively couples with metal, such as the cladding wire 34 and the parent material of the notch face 20, than $CO_2$ lasers do. This is significant since less energy is therefore needed to apply the required amount of hardsurfacing material to the notch face 20. Less energy corresponds with less heat affected damage, such as microcracks, in the parent material of the tip shroud 16 below the notch face 20. Less energy is further significant for minimizing the level of heat input into the hardsurfacing process which decreases the amount of dilution of the cladding wire 34 in the parent material of the notch face 20.

Dilution is a conventional term which indicates that the cladding wire material is diluted or absorbed into the material of the notch face 20. Increased dilution means that the cladding material is effectively lost within the parent material of the notch face 20 itself and does not effectively build up above the notch face 20. Dilution also corresponds with the heat affected zone of the notch face 20 below its surface in which material properties are inherently degraded leading to microcracks therein. It is desirable to decrease the size and number of microcracks in the notch face 20 for improving useful life of the buckets 10 during operation. In the worst case, excessive dilution and excessive damage to the notch face 20 during the hardsurfacing treatment will ruin the tip shroud 16 rendering the entire bucket 10 unusable, with an attendant waste of time and money.

Accordingly, it is desirable to operate the YAG laser 24 at relatively low power compared to conventional $CO_2$ lasers, but nevertheless with sufficient energy for suitably melting the cladding wire to effect the hardsurfacing treatment. In an exemplary embodiment, the power level of the laser 24 is within a range of about 0.5–2.5 kW average power applied to the wire 34 at the spot 28, which covers operation of both continuous wave and pulse lasers. This low level of heat input minimizes undesirable dilution and heat affected zone in the notch face 20. The cladding wire 34 is therefore suitably melted and forms the cladding layer 36 with a maximum thickness t per pass, and minimum dilution thereof below or into the notch face 20. By minimizing the level of heat input, the amount of dilution of the wire 34 can be readily controlled within desirable tolerances. Minimizing dilution may decrease or eliminate the formation of welding defects such as cracks and voids in both the hardsurfacing material and the heat affected zone of the notch face 20.

In addition to controlling the laser power within the desired range disclosed above, additional parameters that may be selectively varied include the scanning speed of the laser beam 26, the laser power density, the wire feedrate, and the wire size, which all affect the thickness of the hardsurfacing cladding layer 36. By varying these parameters, it is more possible to provide a near net shape hardsurface cladding in the several layers 36 which is closer to the desired geometry than that which may be effected using a conventional powder material. The term near net shape is a conventional term indicating the ability to provide a component within suitably small tolerances closely approximating the desired final geometry of the component without machining. In an ideal near net shape configuration, no post-machining operation is required for removing excess material, and no additional process is required for adding material to an undersized component. Accordingly, the method parameters described above may be selected so that a plurality of the cladding layers 36, as illustrated in FIG. 5 for example, define a near net shape of the hardsurface cladding, without the need for post-machining or TIG layer supplements.

In the exemplary embodiment illustrated, the turbine bucket 10 and the corresponding tip shroud 16 are formed of a conventional nickel based superalloy such as those conventional known as U500, IN738, and GTD111, for example. These superalloys are conventionally difficult to weld or hardsurface. For example, the latter two alloys include aluminum in the range of about 3.0–3.5% by weight, i.e., 3.0% for the GTD111 and 3.5% for the IN738. And, titanium in a range of about 3.5–4.9%, i.e., 3.5% for the IN738 and 4.9% by weight for the GTD111. In a preferred embodiment, the cladding wire 34 comprises commercially available Stellite which is defined as 28Cr-19.5W-5Ni (% by weight) and is a cobalt based superalloy. The hardsurfacing apparatus 22 and method in accordance with the present invention are effective for suitably hardsurfacing the nickel based superalloy tip shroud 16 with the cobalt based superalloy Stellite wire 34 with less cracking and heat affected zone than that available from the higher power and less efficiently coupled conventional $CO_2$ lasers conventionally used with powder cladding material. As indicated above typical powder cladding is not fully effectively used in hardsurfacing treatment and is additionally subject to a non-uniformity of deposition thereof which typically forms valleys therein which must be filled. The cladding wire 34 is more effective in depositing a flat and level surface on the notch face 20 without the problems attendant with powder cladding.

As indicated above any type of suitable pattern of traversing of the laser beam 26 and wire 34 may be provided over the notch face 20. The traversing is typically in a linear, substantially straight path, with suitable arcuate curves between passes. A finite width W cladding layer 36 is therefore deposited, with adjoining passes being required for providing a continuous and uniform layer over the notch face 20. If desired, the laser beam 26 may be conventionally dithered or laterally oscillated as it is traversed for widening the effective width of each deposited cladding layer 36. In this example, dithering of the laser beam 26 is effected while feeding the hardsurfacing wire 34 at a higher translating speed than that of the laser beam 26 itself. In this way sufficient material is deposited along the dithering path for increasing the effective width of the deposited layers 36.

Significant advantages of the laser and wire feed approach described above for hardsurfacing Z-notch faces 20 may include reduced process cycle time, reduced or eliminated post-machining, less sensitivity to welding of crack sensitive superalloys, and better cost effectiveness.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A method for hardsurface cladding a turbine bucket tip shroud notch face configured for contact engagement with an adjacent tip shroud notch face comprising:
   generating a laser beam from a neodymium:yttrium-aluminum-garnet laser;
   directing said laser beam on said notch face at a spot to provide heat input thereat;
   dispensing a hardsurface cladding wire comprising a cobalt based superalloy at said spot under a shielding gas for being melted by said laser beam to form a molten cladding layer on said notch face, said notch face comprising a nickel based superalloy;

selecting a power level of the laser beam to limit a dilution of the molten cladding layer into the notch face;

traversing said laser beam and wire over said notch face to continue said cladding layer completely over said entire notch face; and cooling said molten cladding layer to solidify in a hardsurface cladding layer integrally bonded to said notch face.

2. A method according to claim 1 further comprising operating said laser at a power level to melt said wire and form said cladding layer with maximum thickness and minimum dilution thereof below said notch face.

3. A method according to claim 2 wherein said laser power level is within a range of about 0.5–2.5 kW applied to said wire at said spot.

4. A method according to claim 1 further comprising traversing said laser beam and wire over said notch face with adjoining passes to form a substantially flat hardsurface cladding layer over said entire notch face.

5. A method according to claim 4 further comprising traversing said laser beam and wire over said notch face to form a plurality of said cladding layers having a collective thickness above said notch face.

6. A method according to claim 5 wherein said plurality of cladding layers define a near net shape of said hardsurface cladding.

7. A method according to claim 4 wherein said laser beam is a continuous wave.

8. A method according to claim 1 wherein said cladding wire comprises 28% by weight Cr, 19.5% by weight W and 5% by weight Ni.

9. A method according to claim 1 wherein said tip shroud superalloy includes aluminum in a range of about 3.0–3.5% by weight, and titanium in a range of about 3.5–4.9% by weight.

10. A method for hardsurface cladding a turbine bucket tip shroud notch face configured for contact engagement with an adjacent tip shroud notch face comprising:

generating a laser beam from a neodymium:yttrium-aluminum-garnet laser;

directing said laser beam on said notch face at a spot to provide heat input thereat;

dispensing a hardsurface cladding wire at said spot under a shielding gas for being melted by said laser beam to form a molten cladding layer on said notch face;

traversing said laser beam and wire over said notch face with adjoining passes to form a substantially flat hardsurface cladding layer over said entire notch face;

dithering said laser beam and dispersing said wire at a greater speed than said laser beam is traversed to widen each of said passes; and cooling said molten cladding layer to solidify in a hardsurface cladding layer integrally bonded to said notch face.

11. An apparatus for hardsurface cladding a turbine bucket tip shroud notch face configured for contact engagement with an adjacent tip shroud notch face comprising:

a neodymium:yttrium-aluminum-garnet laser for generating a laser beam at a spot on said notch face to provide heat input thereat;

means for dispensing a hardsurfacing cladding wire at said spot under a shielding gas for being melted by said laser beam to form a molten cladding layer on said notch face; and means for traversing said laser beam and wire over said notch face to continue said cladding layer completely over said entire notch face;

wherein said traversing means are effective for traversing said laser beam and wire over said notch face with adjoining passes to form a substantially flat hardsurface cladding layer over said entire notch face;

wherein said traversing means are further effective for traversing said laser beam and wire over said notch face to form a plurality of said cladding layers having a collective thickness above said notch face;

wherein said traversing means are further effective for dithering said laser beam, and said dispensing means are effective for dispensing said wire at a greater speed than said laser beam is traversed to widen each of said passes;

wherein cooling of said molten cladding layer solidifies said layer into a hardsurface cladding layer integrally bonded to said notch face.

12. An apparatus according to claim 11 wherein said laser is a continuous wave laser for generating a continuous wave laser beam.

* * * * *